H. P. DE CORREVONT.
FLEXIBLE SHAFT LUBRICATION.
APPLICATION FILED OCT. 18, 1919.

1,357,966.

Patented Nov. 9, 1920.

UNITED STATES PATENT OFFICE.

HOWARD P. DE CORREVONT, OF CHICAGO, ILLINOIS, ASSIGNOR TO STEWART-WARNER SPEEDOMETER CORPORATION, OF CHICAGO, ILLINOIS, A CORPORATION OF VIRGINIA.

FLEXIBLE-SHAFT LUBRICATION.

1,357,966.   Specification of Letters Patent.   Patented Nov. 9, 1920.

Application filed October 18, 1919. Serial No. 331,709.

*To all whom it may concern:*

Be it known that I, HOWARD P. DE CORREVONT, a citizen of the United States, residing at Chicago, in the county of Cook and the State of Illinois, have invented certain new and useful Improvements in Flexible-Shaft Lubrication, of which the following is a specification, reference being had to the accompanying drawings, forming a part thereof.

The purpose of this invention is to provide an improved construction of flexible shaft casing for providing grease to the casing to lubricate the flexible shaft therein. It consists in the elements and features of construction shown and described, as indicated in the claim.

Figure 1:
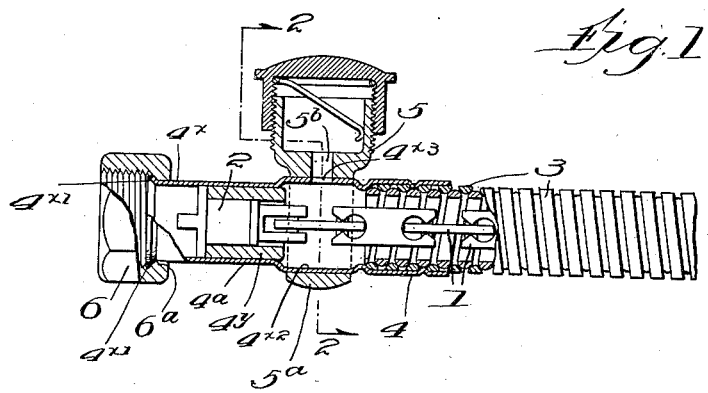
Figure 1 is an axial section of a portion of a flexible shaft casing with the shaft therein equipped with this invention.
Figure 2:
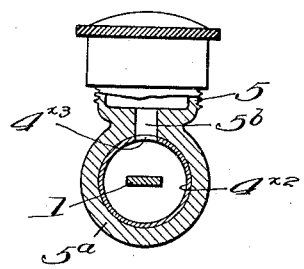
Fig. 2 is a section at the line, 2—2, on Fig. 1.

The drawing shows a flexible shaft which is of common construction as to its general character, comprising a flexible shaft member of the chain type,—that is, comprising links, 1, 1, and having a terminal coupling member, 2, and a flexible casing, 3, in which said shaft is inclosed having a terminal fitting, 4, which affords a journal bearing at $4^a$, for the shaft coupling terminal, 2. The fitting, 4, is provided at the outer end with any usual means for coupling it to the bearing of a shaft with which the flexible shaft coupling, 2, is designed to be connected for operation. In the drawing, the construction for this purpose consists merely of an interiorly threaded coupling, 6, of familiar form, with whose interiorly projecting flange, $6^a$, at the end opposite that which is interiorly threaded for attachment, engages an outwardly turned flange, $4^{x1}$, swaged on the end of the shell, $4^x$, (hereinafter particularly described)—after said end is entered into the flanged end of the coupling.

The invention herein claimed consists in providing in the particular manner described, a grease cup on the fitting, 4, for holding grease to lubricate the shaft within the casing, in substitution of the heretofore common method of filling the casing with grease when the flexible shaft member is first assembled, and dis-assembling whenever it is necessary to supply the grease.

The terminal fitting, 4, for the purpose indicated is made to comprise the following parts: first, a thin, tubular metal shell, $4^x$; second, a bushing, $4^y$, clasped in one end portion of the shell, and third, a grease cup, 5, mounted on the outside of the shell in the manner now to be described. The shell, $4^x$, is expanded in diameter at a portion of its length intermediate the end portion, as shown at $4^{x2}$. The grease cup, 5, has its face consisting of a ring, $5^a$, having its axis transverse to the depth of the cup, and its inner diameter such as to adapt it to make a substantially drive fit outside the expanded portion, $4^{x2}$, of the shell, $4^x$. The bushing, $4^y$, which forms the journal bearing as stated for the terminal coupling member of the flexible shaft, is similarly adapted for drive fit within the unexpanded end portion of the shell, $4^x$. The flexible casing, 3, is secured in any convenient manner in the opposite end portion of the shell, stopping short of the expanded middle portion, $4^{x2}$, so as to leave a free pocket or chamber at that portion of the shell around the flexible shaft passing therethrough, for free entrance of the grease into the cavity of the casing for lubricating the shaft therein. The bushing, $4^y$, and grease cup, 5, base ring, $5^a$, making drive fit with the shell as stated, may be further secured by sweating onto their seats, if found desirable for security of the positioning of the parts with respect to each other.

The discharge duct, $5^b$, of the grease cup, 5, registers with an aperture, $4^{x3}$, in the expanded portion, $4^{x2}$, of the shell, $4^x$. Registration may be insured by drilling the aperture after the grease cup is in position on the shell.

I claim:—

A flexible shaft member comprising a flexible casing and a flexible shaft extending therein which has a terminal coupling member; a terminal fitting for the flexible casing, comprising a thin tubular metal shell having a portion intermediate its end portions expanded in diameter; a bushing to afford journal bearing for the terminal coupling member of the shaft secured in one unreduced end portion of the shell, the flexible casing being secured in the opposite end portion of the shaft, and a grease cup whose base is a ring with its axis transverse to the depth of the cup adapted for drive fit on the outside of said expanded portion of the shell, said expanded portion having an aperture for registering with the discharge of the grease cup.

In testimony whereof I have hereunto set my hand at Chicago, Illinois, this 10th day of October, 1919.

HOWARD P. DE CORREVONT.